Aug. 14, 1962 F. P. GOHOREL 3,049,594

TELEPHONE SYSTEMS

Filed May 2, 1958 7 Sheets-Sheet 1

Inventor
F. P. Gohorel
By Robert Harding Jr.
Attorney

Aug. 14, 1962 F. P. GOHOREL 3,049,594

TELEPHONE SYSTEMS

Filed May 2, 1958 7 Sheets-Sheet 2

Inventor
F. P. Gohorel
By Robert Harding Jr.
Attorney

TELEPHONE SYSTEMS

Filed May 2, 1958

Inventor
F. P. Gohorel
By Robert Harding Jr.
Attorney

Inventor
F. P. Gohorel
By Robert Harding Jr.
Attorney

Aug. 14, 1962

F. P. GOHOREL 3,049,594

TELEPHONE SYSTEMS

Filed May 2, 1958

7 Sheets-Sheet 5

*Inventor*
F. P. Gohorel
By Robert Harding Jr.
*Attorney*

Aug. 14, 1962

F. P. GOHOREL 3,049,594

TELEPHONE SYSTEMS

Filed May 2, 1958

7 Sheets-Sheet 6

Inventor
F. P. Gohorel
By Robert Harding Jr.
Attorney

Inventor
F. P. Gohorel
By Robert Harding Jr.
Attorney

United States Patent Office 3,049,594

Patented Aug. 14, 1962

3,049,594
TELEPHONE SYSTEMS

Fernand Pierre Gohorel, Antony, France, assignor to International Standard Electric Corporation, New York, N.Y., a corporation of Delaware Filed May 2, 1958, Ser. No. 732,530
Claims priority, application France June 27, 1957
12 Claims. (Cl. 179—18)

The present invention refers to improvements in automatic telephone systems and more particularly in those using crossbar type switches or multiselectors.

In certain systems of this type, one or more group-selecting stages are used to select a free line giving access to the group serving a called local subscriber, to an outgoing circuit, to a special service, etc. A line-selecting means is provided to select the called subscriber within the group serving him. Each group- or line-selecting stage consists of a certain number of means. Each such means, comprising a certain number of crossbar switches, is driven and controlled by one or more common devices or "markers." In order to perform its functions, each marker must receive a certain number of signals, concerning either the group serving the called subscriber or his rank within his group. These various signals are supplied to the proper markers by the register with which the calling subscriber is temporarily associated. Owing to their high cost, the markers are relatively small in number and arrangements must be provided to reduce their holding time to a minimum. Therefore, all the signals that a marker can receive from the register are coded, so it is necessary to provide a relatively large number of leads, a fact that requires the use of a multipling circuit or trunk bundle between the register and the marker.

The use of such multipling circuits or trunk bundles poses a certain number of problems. In particular, depending upon the nature of the selections to be controlled, it is necessary to send the corresponding markers translated or untranslated selective combinations. Generally, the translated selective combinations are supplied to the seized register from a translator that releases immediately. Such an arrangement leads to providing in the register a certain number of memory circuits of relatively large capacity, something that contributes to increasing the complexity and the cost. In addition, since these memory circuits are needed only to control certain selections, poor use is made of them. Hence arrangements must be provided that, in the register, will allow connecting the multipling circuit or trunk bundle seized by the register both to the memory circuits that have recorded the translated combinations and to the circuits designed to record the numerical portion of the called subscriber's number.

Further, when a call is intended for a subscriber served by a distant exchange, the dialing pulses are sent from a sender of suitable type (decimal or multifrequency pulses). The latter receives the corresponding signals from the register through the multipling circuit or trunk bundle. Normally, each sender must test the multipling circuit or trunk bundle serving it before being associated with it. In a large exchange, the number of pulse senders is relatively high. The same is true of the test devices associated with these senders. The holding time of a sender and more particularly of a decimal-pulse sender is relatively long as compared with the holding time of a marker, for example. The result is that the test devices associated with these senders are not used efficiently.

The present invention provides arrangements that allow considerable simplification in the design of the registers, the multipling circuits or trunk bundles and the pulse senders.

One of the features of the invention is an automatic telephone system comprising common devices and individual devices intended to control selections and certain other auxiliary functions, such as determination of the tolls, the exchange of coded information between these devices being effected by using trunk bundles designed to associate them temporarily, the number of such trunk bundles to be provided in an exchange being relatively small because of their short holding time.

Some common or individual devices have a relatively long holding time, such being the case, for example, of outgoing registers or trunks sending toll pulses to the calling subscriber's meter. The holding time of such devices by the trunk bundle may be allowed to be longer than for devices having a very short holding time, such as the markers.

Another feature of the invention is that such devices can be connected to the trunk bundles through concentration devices, such an arrangement making it possible to reduce the connection points giving access to said trunk bundles.

Another feature of the invention lies in so separating the functions of the various trunk bundles that each of them will serve a specific group of common devices, such an arrangement making it possible to increase operating dependability by avoiding the drawbacks of too-large a concentration and to facilitate the identification of said trunk bundles.

Another feature of the invention is that common devices served by a limited number of trunk bundles are regarded as active devices in the sense that they make a choice among the various trunk bundles available, the trunk bundle selected sending, through the selection chain, an identification signal to the passive device having access to all the trunk bundles of the exchange, said passive device being thereupon connected to the trunk bundle selected.

Another feature of the invention lies in connecting a register to a trunk bundle through a concentration device or coupler, this latter being further capable of connecting itself to a free translator, the multiple connection thus established then allowing the register to send part of the called subscriber's number to the translator, which analyzes it and, over the trunk bundle seized, sends the corresponding selective combinations to the common device seized (a marker, for example), such an arrangement thus making it possible to eliminate in the register the memory circuits normally provided for recording the translated selective combinations and also to simplify the registers by transferring a certain number of functions to the common coupler.

Since the register no longer contains memory circuits designed to record translated selective combinations, it follows that the translator must be seized each time a local or distant selection requires the use of said combinations. Hence it becomes necessary to reduce the holding time of this device to a minimum.

Another feature of the invention is that the register is associated with a free coupler whenever a selection must be controlled, said coupler, after having tested the first-selector frame of the particular means involved, then controlling the seizure of a translator and sending, through the register and the partly-established speaking chain, a signal causing the seizure of a marker, said marker then selecting a trunk bundle serving it, the latter sending, through the marker and said chain, a suitable signal allowing the coupler to identify it and be connected to it.

Another feature of the invention is that the marker, when it has suitably received the translated selective combinations, does not cause the release of the seized trunk bundle until after having sent the coupler a signal allowing the latter to cause the release of the translator.

Another feature of the invention is that the marker, at the beginning of the control of a selection means, is associated anew with a trunk bundle, whose identity is sent in coded form, by the partly-established selection chain, to the coupler, the latter then seizing said trunk bundle and thus promising the marker to send to the register a signal concerning the action to be taken on the call, said marker and the trunk bundle being thereupon released.

In large exchanges it is often necessary to provide a plurality of group-selecting stages. Generally, arrangements are provided in this case in order to prevent the starting of these selection operations until after the register has received the digits that will enable it to control the final group-selecting stage.

Another feature of the invention lies in not releasing the seized coupler at the end of the control of a group-selecting stage, in order to allow said coupler to test immediately the first-selector frame of the next stage with which the register has just been connected.

The translated combinations sent by the translator must be modified in line with the nature of the group-selecting stage to be controlled.

Another feature of the invention is to provide arrangements allowing the register to tell the seized coupler at any time and by any suitable means the degree of progress of selections under way, the coupler being thus able to warn the translator at each seizure in order to enable it to modify accordingly the translated combinations it must provide.

The control of certain local-selection stages may require sending the seized marker untranslated selective combinations.

Another feature of the invention is that the signals sent by the register to the coupler in order to tell it the degree of progress of the various selections further allow the latter not to bring about the seizure of a translator when it is a question of sending the seized marker untranslated selective combinations, said coupler in that case connecting the trunk bundle directly to the register in order to allow the latter to send to said seized marker the called number's portion required for the control of the corresponding selection.

When a call is intended for a subscriber served by a distant exchange, the register of the outgoing exchange is associated at the end of the local selections with a pulse sender of suitable type. The various selective combinations required for the control of the distant selections are sent in code in succession to said sender, which sends them out in the form of pulses of suitable type. These coded selective combinations are sent to the sender through the trunk bundle.

Another feature of the invention is to divide the pulse senders into groups with each of which is associated an auxiliary trunk capable of connecting any one of said senders to a trunk bundle, such an arrangement thus making it possible to simplify the design of the senders considerably through elimination from their respective equipment of devices required to test the trunk bundles.

Another feature of the invention is that at the onset of the control of outside selections, the register is associated with a free coupler after first having been connected to a pulse sender of suitable type, said coupler then testing the auxiliary trunk serving said sender, which is thereupon connected to said auxiliary trunk, the latter being then associated with a free trunk bundle, the identity of which is sent through the pulse sender and the register to the seized coupler, the latter being then connected to the trunk bundle in order to send the sender the corresponding selective combinations.

When an outgoing call must pass in transit through a certain number of exchanges, the called subscriber's number code must be sent once or more in translated or untranslated form, depending upon the destination of the call.

Another feature of the invention is that the translator, when seized for the first time by the register and at the start of the control of the local selections, sends the latter a signal telling it whether the code must be sent out later in translated or untranslated form, said register being associated immediately, at the beginning of the control of the outside selections, first with a pulse sender of suitable type and then with a coupler, the latter, depending upon the case, either being connected to a translator or connecting the register directly to the trunk bundle in order to transfer the necessary selective combinations to the sender seized.

Various other features of the invention will become apparent from the description that follows, given as a nonlimitative example with reference to the accompanying drawing, wherein.

Figure 1:
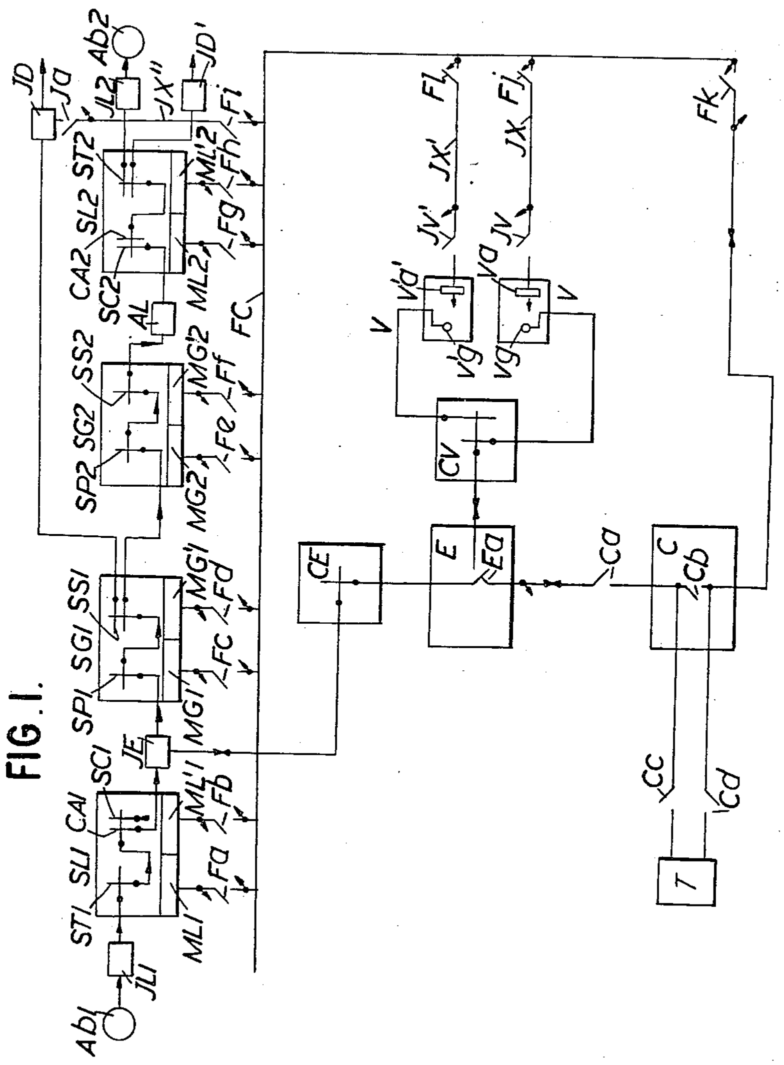
FIG. 1 is a wiring diagram intended to explain the general operation of the system.

The general operation of the system will now be described, with reference to FIG. 1. Throughout what follows, the term "connector" will be used to designate a set of devices arranged at the end of a circuit or of a line and intended to connect said circuit or said line to the equipment of the exchange involved. In the description that follows, a summary will first be given of the arrangement of the various devices and of the method of routing a call in a telephone exchange using crossbar switches, ordinarily called multiselectors.

It will be assumed throughout what follows that the switches used for establishing a connection are crossbar switches or multiselectors of known type comprising a certain number of individual selectors. The selection of a predetermined outgoing line is effected by means of devices calling selecting bars. Each of these bars is associated with two selection magnets and can take two operating positions depending upon the magnet energized. On taking one of these positions, said bar prepares the connection of an individual selector to two outgoing lines. The selection of one of these lines is effected by causing the operation of one or the other of the two magnets associated with a supplementary selecting bar or "switching magnets," according to a known principle. If $a$ designates the number of selecting bars (without counting the supplementary bars), $2a$ selection magnets are obtained and a selection can be made between two series of lines, each comprising $2a$ lines. The selection of a series of lines is effected by one of the two magnets associated with the supplementary bar; the selection of a line within the series is effected by means of one of the $2a$ selection magnets mentioned above.

The selection magnets only prepare the connection of an individual selector to a line, said connection being caused by a bar operated by an operating or connecting magnet individual to each individual selector. The connection is held as long as that magnet remains energized, regardless of the position of the selection magnet that has prepared the connection. In the following descriptions the term "frame" will be used to designate the set of individual selectors of the same multiselector and the relays used for the control of said selectors.

It is also possible, according to a known method, not to use the supplementary selecting bar for the selection of a series of lines; in that case, the number of lines among which a selection can be made is reduced by one-half, but on the other hand each of these lines comprises twice as many wires. The supplementary selecting bar can then perform the same functions as the other bars, so two more lines can be selected.

The selectors are grouped on metal frames. Within a frame, the similar outlets of the various selectors are multipled to one another horizontally (the selectors being assumed mounted vertically side by side within a frame). These frame are represented schematically in FIG. 1 by two heavy (horizontal and vertical) lines, one for the above-mentioned horizontal multiplings and the other for the selectors of the frame.

The automatic switchboard here under consideration serves a certain number of subscribers divided up into groups. A group-selecting means selects the called subscriber's group from among those of the exchange involved; a line-selecting means selects the called subscriber within the group serving him.

In the telephone system under consideration, the various line-selecting means SL1 and SL2 (FIG. 1) and group-selecting means SG1 and SG2 are controlled by markers associated with said means.

To connect these various markers to the seized register E, a certain number of connecting-wire groups are available. These latter are regrouped so as to form connecting bundles called "trunk bundles." Each common member, such as a marker, is served by a specific trunk bundle. In other words, this device accordingly has access to a certain number of connecting-wire groups.

On the other hand, each register can have access to all the trunk bundles of the exchange.

In order to simplify the description that follows, it will be assumed, by way of example, that the exchange involved has only one trunk bundle FC, comprising a certain number of wire groups.

More specifically, the hunting is for a free call finder CA1 having access to a free register. A free register having access to said call finder is thereupon connected to the latter.

Moreover, the one of the two markers ML1 or ML'1 serving line-selecting means SL1 is seized and marks subscriber line *Ab*1 "calling" on the banks of final selectors ST1. The marker then hunts for a free inside line capable of connecting subscriber line *Ab*1 to call finder CA1.

Upon the seizure of register E, the latter is associated with a connecting device C, called a "coupler" in the descriptions that follow.

Marker ML1 for example is then associated with a wire group of the trunk bundle FC serving it (through multiple contact F*a*) and sends to the coupler C seized by register E the identity of said wire group. The coupler is then associated with the wire group presently seized by marker ML1 through multiple contact F*k*) in order to allow said marker to send register E a category signal telling it the nature of the calling line (restricted-service subscriber, absent subscriber, etc.). The seized marker also sends register E the connecting signal; the register in turn sends this signal to line-selecting means SL1 through register finder CE and register connector JE. This signal also entails the connection of final selector ST1 and of call finder CA1. Calling subscriber *Ab*1 is then connected to register E and receives the dialing tone. During this time, marker ML1 has released, along with coupler C and the wire group of trunk bundle FC.

It will be assumed, by way of example, that the call being put through is a local call and that calling subscriber *Ab*1 wants to be connected to called subscriber *Ab*2, served by line-selecting means SL2.

Having received the dialing tone, subscriber *Ab*1 dials the number of subscriber *Ab*2. The corresponding pulses are received at register E in accordance with the usual method. When the register has received digits in sufficient number to be able to control the group-selection operations, it is associated anew with a free coupler C (through multiple contact C*a*). The coupler tests the frame containing the first selector SP1 with which register E is engaged, in order to make sure that no connection operation is then in progress in the frame involved. If this test is successful, coupler C controls the seizure of one of the markers MG1 or MG'1 serving group-selecting means SG1 by sending a signal that crosses register E, register finder CE and register connector JE. Once the marker has been seized, it sends back a return signal to the coupler through the previously-described chain.

Coupler C is then associated with a free translator T through multiple contacts C*c*, C*d* of connecting relays. Coupler C then receives from register E a signal telling it that the first group-selecting stage SG1 must be controlled. This information, recorded in coupler C, is sent to translator T upon its seizure. At the same time, this translator receives from register E, through coupler C, the called number's first digits, required for the control of the group-selecting operations.

Moreover, upon its seizure, one of the markers of the first group-selecting stage, MG1 for example, is associated with a wire group of trunk bundle FC through multiple contact F*c*. When so associated, the identity of this wire group is sent to coupler C through register connector JE, register finder CE and register E.

This coupler can then be connected to the particular wire group involved through multiple contact F*k*. A direct connection is thus established between translator T and group marker MG1 through multiple contact C*d*. The marker then receives from this translator T the selective combinations that will allow it to control group-selecting means SG1. As soon as marker MG1 has received these selective combinations, the seized wire group of trunk bundle FC is released, along with translator T. However, coupler C remains associated with register E.

When the control of group-selecting means SG1 is about to be completed, marker MG1 is associated a second time with a free wire-group of trunk bundle FC, which transfers its identity to coupler C through the above-described chain. The latter is again connected to this wire group, thus allowing marker MG1 to tell the register the outcome of the selecting operations in progress (possibility of connection, lack of inside path, etc.) If all the selecting operations develop normally, the connection signal received from the marker is sent to the register, which in turn causes the operation of first selector SP1 and of second selector SS1 through register E, register finder CE, etc.

The seized marker MG1 releases the seized wire group of trunk bundle FC and releases in turn. Register E then transfers to coupler C a signal telling it that the control operations of second group-selecting stage SG2 are going to begin. As stated before, coupler C tests selector frame SP2 and so forth. Second group-selecting stage SG2 is controlled the same way as described with reference to group-selecting stage SG1.

Register E releases coupler C at the end of the group-selecting operations.

When calling subscriber *Ab*1 has finished dialing the number of called subscriber *Ab*2, the register is again associated with a coupler C, which tests the frame containing the fifties selector SC2 currently engaged by register E. If this test is successful, one of the two markers serving line-selecting means SL2 is seized. This marker is in turn associated with a wire group of trunk bundle FC, which transfers its identity to coupler C in accordance with a method already described. Coupler C in turn is connected to this wire group in order to allow the last digits of the called subscriber's number to be transferred from register E to the currently-seized marker, ML2 for example.

Translator T is not used to control the line-selecting operations. In fact, when coupler C is seized by the register to control the line-selecting operations, it receives a signal from the latter telling it that said operations are to take place. The reception of this signal has the effect of preventing the seizure of a translator and of causing the closing of a multiple contact C*b* intended to bring about the connection of the transfer-signal wire group of the seized trunk bundle FC to the contacts of the memory relays that provided for the recording of the last digits of the called subscriber's number in register E.

When marker ML2 has suitably received the codes from the register, the seized wire group of trunk bundle FC is released.

Line-selecting stage SL2 is thereupon controlled in accordance with a method similar to the one described with reference to group-selecting means SG1. In particular, when the selecting operations have been completed, marker ML2 re-seizes a wire group of trunk bundle FC in order to re-transfer to register E a signal telling it the category of called subscriber *Ab*2 (absent subscriber, cancelled subscriber, etc.). If the connection can be made, marker ML2 so tells register E, which then causes the operation of fifties selector SC2 and of final selector ST2. All the devices that have taken part in routing the call, namely, line marker ML2, the seized wire group of trunk bundle FC, coupler C and register E, are released. Ringing current is sent to called subscriber *Ab*2 from the supply source AL charged with holding the whole previously-established selection chain. When the called subscriber answers, the sending of ringing current ceases and calling subscriber *Ab*1 is connected to him in accordance with the usual method.

If called subscriber *Ab*2 is found busy by line marker ML2, the latter so tells register E after seizing a wire group of trunk bundle FC, and all the above-mentioned devices, including the partly-established selection chain, are released. Calling subscriber *Ab*1 is then so warned over his own line equipment JL1 by receiving the busy signal.

The case will now be discussed of a call intended for a distant exchanger. It will be assumed, by way of example, that the circuit giving access to that exchange operates on numerical pulses.

When calling subscriber *Ab*1 removes his handset he is connected, by a method similar to the one previously described, to a register E through a register connector JE and a register finder CE. When this connection has been established, calling subscriber *Ab*1 receives the dialing tone and dials the called subscriber's number, which is received and recorded by register E in accordance with the usual method.

When register E has received a number of digits sufficient to allow control of the group-selecting operations, it is associated with a coupler C through multiple contact C*a*. Further, it sends this coupler a signal telling it that there will be no need to control first group-selecting stage SG1.

The coupler tests the frame of first selectors SP1 and, if the test is successful, causes the seizure of one of the group markers serving group-selecting stage SG1. Further, a free translator T is seized. The group-selecting operations are controlled in a manner similar to the one described before. However, when translator T receives from register E the called subscriber's office code, it analyzes it and, if required, sends register E a signal through coupler C telling it that the translated code will have to be sent subsequently. This signal is stored by the register in a suitable memory in order to allow the register to re-seize a translator for the sending of the various numerical pulses to the distant exchange. When the control of the group-selecting operations of the first stage is about to be completed, the seized marker, MG1 for example, is associated as before described with a free wire-group of trunk bundle FC and sends the latter a signal telling it the operating method of the outgoing circuit giving access to the distant exchange serving the called subscriber. The connection signal is thereupon sent by this marker to the register, which then causes the connection of first selector SP1 and of second selector SS1. Marker MG1 releases immediately, along with the seized wire group of trunk bundle FC and coupler C.

As FIG. 1 shows, all outgoing paths giving access to distant exchanges are wired at the outlet of first group-selecting stage SG1. Thus, register E is presently seized by the originating connector JD giving access to the wanted exchange.

The register remains seized by the calling subscriber and continues to receive the pulses representing the digits dialed by him. When the register has received the called subscriber's number in full, it is associated with a free decimal-sender V through a sender finder CV. Once this connection has been made, sender V so warns register E, which is then associated with a free coupler C. The latter receives from register E a signal telling it the selection method (decimal selection) and a signal telling it that the code to be sent must be translated and that, in consequence, it will be necessary to seize a translator again.

For the sending in code of the various digits that must be sent again by the sender, the register or the translator use a direct connection comprising a large number of wires, consisting precisely of one of the wire groups of trunk bundle FC. However, for reasons of economy, the decimal senders, as also the multifrequency senders, which will be discussed later, do not have direct access to the wire groups of trunk bundle FC. Accordingly, to establish the desired connection, use is made of a certain number of auxiliary trunks such as JX having access to the wire groups of trunk bundle FC through multiple contacts such as F*j*. Each auxiliary trunk JX can serve a certain number of senders V, with which it can be associated through multiple contacts J*v*.

When coupler C has been re-seized by register E, it tests the auxiliary trunk JX serving the sender V that has just been seized by register E. If this test is successful, the corresponding multiple contact J*v* closes, while auxiliary trunk JX is associated with a free wire-group of trunk bundle FC through multiple contact F*j*. The latter sends its identity to coupler C through sender V, sender finder CV and register E. Once it has this information, coupler C is in turn associated with the seized wire group of the trunk bundle involved through multiple contact F*k*.

Moreover, coupler C is associated with translator T through multiple contacts C*c* and C*d* and further tells the translator that the register is currently engaged with a sender and that the translated code must be sent. The translator receives from register E, in accordance with a usual method, the first portion of the called number, which it translates. Over multiple contact C*d* it transfers the result of the translation to coupler C and thence to sender V through the seized wire group of trunk bundle FC and auxiliary trunk JX.

When the sender has suitably received the selective combinations from the translator, the whole connection previously established between these two devices is released, namely, auxiliary trunk JX, the seized wire group of trunk bundle FC, coupler C and translator T.

Sender V then sends the office code to the originating connector over the following chain: register E, register finder CE, register connector JE, group-selecting stage SG1, originating connector JD.

After having sent the digits it had recorded, sender V releases and so tells register E.

After sending the office code, the called number's numerical portion must be sent to allow control of the selections at the distant exchange. To this end, when translator T is seized the first time by register E at the begining of the group-selecting operations (control of group-selecting stage SG1), it tells the latter the number of numerical portion digits that must actually be sent. This information is stored in the register in suitable memories.

When it has received a sufficient number of digits, the register again brings about the seizure of a free sender V and then of a free coupler C in accordance with a method similar to the one already described.

Since the digits must be sent out again directly from register E to sender V, the translator is not seized. On the other hand, the register sends the coupler a signal telling it that the called number's untranslated digits must be sent, the effect of which is to cause the closing of multiple contact C*b*. Register E is immediately connected to a sender V through a wire group of trunk bundle FC and auxiliary trunk JX. The digits to be sent are transferred in coded form to this sender, whereupon trunk bundle FC, auxiliary trunk JX and coupler C are released as already described.

Once the sending of the digits making up the called number's numerical portion is completed, the connection is made in accordance with the usual method and the register is released.

In the preceding description it has been assumed that the sender must send the translated office code. Accordingly, it has been said that the translator so told the register at the onset of the group-selecting operations. If the office code must not be translated, no corresponding signal is sent by the translator to the register. Therefore, when the latter is going to start controlling the sending of the called number's untranslated office code, it so tells coupler C, thus causing the closing of multiple contact C*b*. Sender V and register E can thus be connected directly.

The method of routing a call to a distant subscriber will now be described in the case of a circuit using voice-frequency coded pulses.

When subscriber A*b*1 removes his handset, he is connected in the usual way to a free register E and he dials the called subscriber's number after first having received the dialing tone.

At the beginning of the group-selecting operations the translator is seized by the register and it sends the latter, if required, a signal telling it that the translated or untranslated office code must be sent subsequently. As the group-selecting operations end, the seized marker, MG1 for example, tells the register the operating method of the outgoing circuit. In particular, in the example under consideration, it tells the register that the seized outgoing circuit operates on multifrequency pulses.

When the group-selecting operations are fully completed, coupler C is released as usual and the register is connected to a multifrequency sender V′ through auxiliary trunk JX′ and a free wire-group of trunk bundle FC.

Each multifrequency sender V′ is provided with a suitable multifrequency receiving device capable of decoding the signals that said sender can receive from the distant register with which it has just been connected through register E, register finder CE, register connector JE, first group-selecting stage SG1 and originating connector JD.

It will be assumed, by way of example, that the wanted connection must pass through a certain number of tandem exchanges. The method of routing such a call has already been described in the aforementioned patent application No. PV 57,148/1,102,559. It will be recalled in this connection that, to route a call to a distant exchange, the originating register must send the called number's office code as many times as there are tandem exchanges to be crossed before reaching the exchange serving the called subscriber. When the call finally reaches that terminating office, the latter sends the seized originating register a special signal inviting it to send first the first portion of the called subscriber's number and then the second.

In the description that follows it will be assumed that the call involved requires the sending of all the digits of the first portion of the called subscriber's number.

When multifrequency sender V′ receives from the first tandem exchange the signal inviting it to send the office code, it so tells register E, which is then connected to a free coupler C. This coupler tests auxiliary trunk JX and, if it is free, it seizes it and connects it to a free wire-group of a free trunk bundle FC.

In accordance with the previously-described method, once this connection has been made the seized wire group of trunk bundle FC sends its identity to coupler C in order to connect it to the latter through multiple contact F*k*. The office code is then sent in coded form to multifrequency sender V′ either from register E, if no translation is to be effected, or otherwise to translator T. It will be recalled in this connection that, if a translated office code must be sent, register E is so told by translator T at the beginning of the group-selecting operations and it consequently causes a new seizure of the translator as soon as it is connected to coupler C upon the seizure of multifrequency sender V′.

When this sender has received the coded signals relative to the sending of the translated or untranslated office code, it sends multifrequency pulses in code 2 out of 5, for example, to the originating connector over the following chain: sender finder CV, register E, register finder CE, . . .

During this sending, the seized wire group of trunk bundle FC and auxiliary trunk JX′ are not released, because the operation of a multifrequency sender is relatively fast. When the sending of the office code has ended, multifrequency sender V′ shifts to receiving position and receives from the distant exchange to which it is now connected a signal calling either for the sending again of the office code or for the sending of the called number's first portion.

If a new sending has to be done, a method similar to the one just described recommences. Otherwise, register E sends multifrequency sender V′ first the first portion of the called number and then the second.

Once the connection between the calling and the called subscriber has been established, register E releases as usual.

The method will now be described of sending the originating connector certain signals concerning the charges to the calling subscriber.

When the outside selections have been completed or, more precisely, when the sending of the dial pulses to the distant exchange has ended, register E so tells originating connector JD, which then sends said register a signal telling it that the sending is required either of the charges or of the called subscriber's number if the call involved must lead to the printing of a ticket.

In both cases, the register is associated with a free coupler, which then tests the auxiliary trunk JX″ serving the originating connector JD. In this connection, it will be noticed in FIG. 1, that the originating connectors are arranged the same way as senders V or multifrequency senders V′. In other words, these originating connectors, for reasons of economy, do not have direct access to the wire groups of trunk bundle FC; to connect them to these latter, it comprises a certain number of auxiliary trunks JX″, each of them being permanently assigned to a specific number of originating connectors.

If the charges must be sent, register E is associated again with a coupler C and with a translator T and sends the latter the called number's office code together with a signal telling it that the charges must be sent. Further, coupler C tests auxiliary trunk JX″, which, if free, is associated with a wire group of trunk bundle FC. The latter in turn sends back to coupler C a signal characteristic of its identity in order to allow the latter to be associated with said trunk bundle. Once this association has been effected, translator T transfers the tolls signals to originating connector JD through the seized wire group of trunk bundle FC and through auxiliary trunk JX″.

Where the called subscriber's number must be sent, translator T is not seized and register E sends said number in coded form directly to originating connector JD by using coupler C, trunk bundle FC and auxiliary trunk JX″. Accordingly, upon the seizure of the coupler, register E sends it a signal telling it that the translator is not to be seized but that, on the other hand, multiple contact Cb must be closed.

In the foregoing description it has been assumed that there was only one trunk bundle FC capable of connecting the various individual devices of the exchange involved to register E through a free coupler C. In very large exchanges it may be necessary to allot the trunk bundles, that is, to assign each of them to a certain number of specific common devices. The trunk bundles, for example, could be so allotted, so that some would serve the line markers, while others would serve the markers of the first group-selecting stage, etc.

Figures 7, 8, 9:
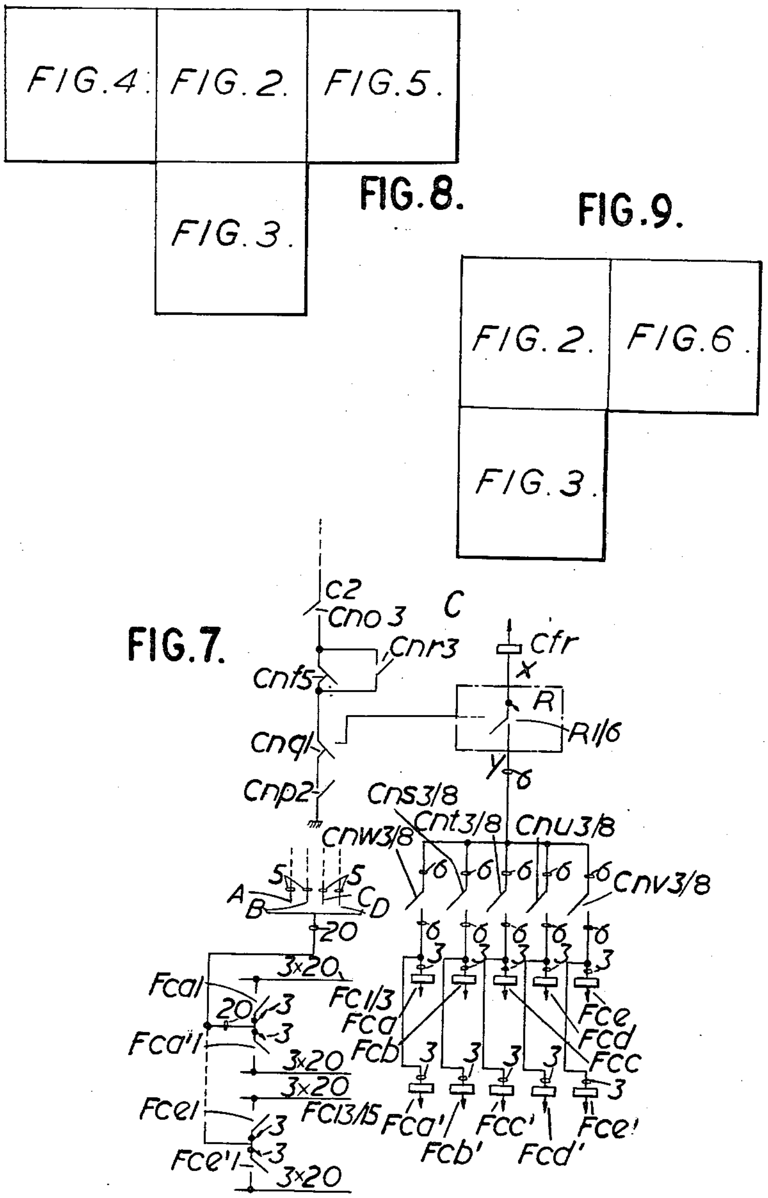
FIG. 7 shows an embodiment variant of the coupler.
FIGS. 8 and 9 show how FIGS. 2 to 7 should be assembled.

Arranging the figures of the drawing as shown in FIG. 8, a description will now be given of the detailed operation of certain means already described and more particularly of the coupler and of the trunk bundle.

Figure 2:
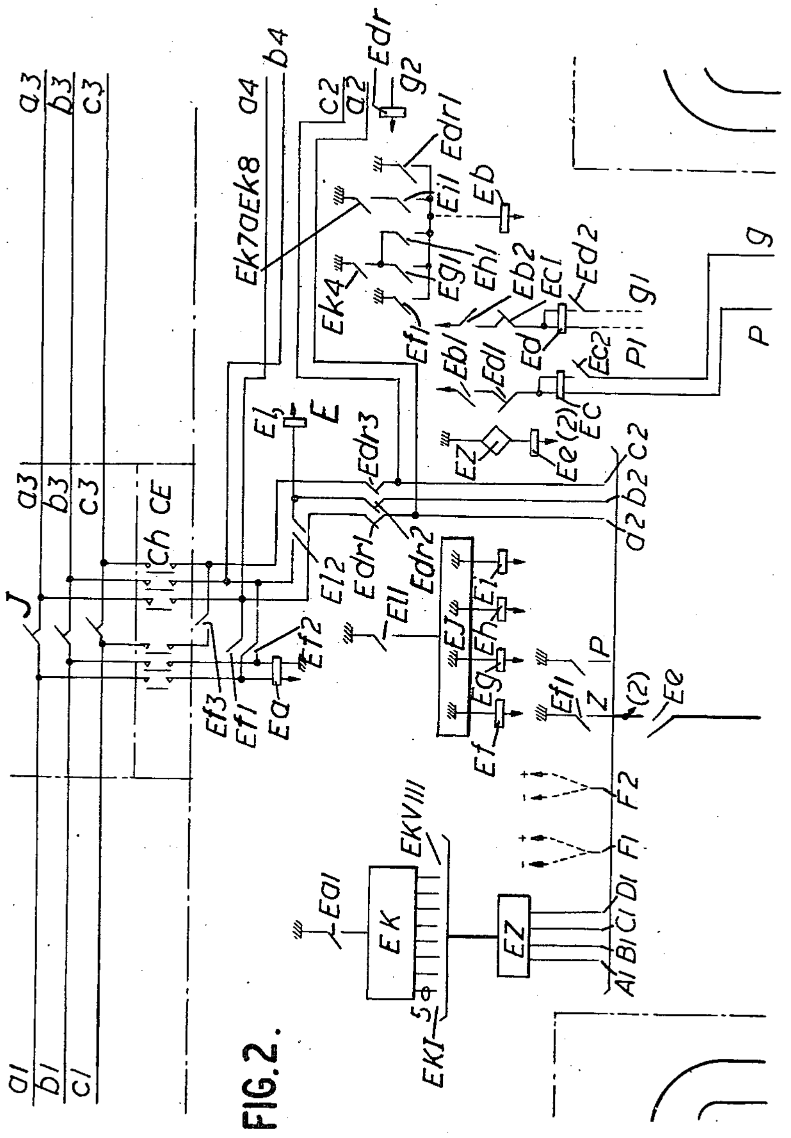
FIG. 2 is a simplified schematic of certain circuits of a register.

FIG. 2 shows certain circuit components of register E that are required in order to understand this detailed operation.

By way of example, the method of routing a call intended for a subscriber served by the exchange involved will be described first.

When calling subscriber A*b*1 (FIG. 1) removes his handset, his line connector JL1 is marked "calling" in the line-selecting means SL1 to which he is connected. During the line-selecting operations, a call finder CA1 having access to a free register E is selected and connected to said register. When this seizure has been effected, relay E*f* (FIG. 2) energizes, its energizing circuit being completed over a circuit not shown. Relay E*f* forms part, in register E, of an operating chain EJ further comprising relays E*g*, E*h* and E*i*, and its function is to characterize at each instant in said register the degree of progress of the various selection operations. In particular, relay E*f* characterizes, through its energization (upon the seizure of register E), the hunting phase of the calling line of subscriber A*b*1.

The energization of relay E*f* entails the energization of relay E*b* over battery, energizing winding of relay E*b*, front contact E*f*1, ground.

Relay E*b* has the function of starting the hunting for a free coupler C (FIG. 1).

It will be assumed, by way of example, that two couplers are available to serve 14 registers such as the one shown in FIG. 2. Two test relays E*c*, E*d*, mutually locked over their back contacts E*d*1, E*c*1, are available in each register. The energization of relay E*b* has the effect of applying potential to the energizing windings of these relays in order to test the two couplers serving the register involved.

Each coupler has a test wire *p*, normally grounded when the particular coupler involved is free. The closing of front contacts E*b*1 and E*b*2 therefore has the effect of causing the simultaneous energization of the two test relays E*c* and E*d* over the following circuits: ground, back contacts C*ng*2, C*nl*1, C*nx*1, wire *p* through coupler C and register E, left-hand winding of test relay E*c*, back E*d*1, front E*b*1, battery.

As regards the second relay E*d*, a similar circuit is completed in the second coupler. These two relays being mutually locked, they cannot hold simultaneously if the 2 couplers serving the register are free at that particular moment.

In accordance with a classical method, only one of these relays will therefore actually hold and thereby complete for itself a holding circuit through the closing of its front contact E*c*2: battery, front E*b*1, back E*d*1, right-hand winding of test relay E*c*, front E*c*2, wire *g* through register E and coupler C, energizing winding of relay C*ng*, ground.

The relay C*ng* energizing is the coupler-seizing relay. Over its front contact C*ng*1 it provides the general holding of the various relays of this device, whose function will be explained hereinafter.

The opening of back contact C*ng*2 breaks this coupler's availability circuit.

The register comprises a verification tablet E*z* intended to verify that only one of the relays E*c* associated with the various registers served by a predetermined coupler is energized at a particular moment. In other words, this arrangement allows checking that only one register is engaged with a predetermined coupler at any particular moment. If this condition is met, control tablet E*z* provides metallic continuity, in accordance with a known method, thus allowing relay E*e* to energize. Since each register has access to 2 couplers, 2 control tablets such as E*z* are associated with 2 relays such as E*e*.

Each relay E*e* is designed to connect the various drive and control wires of register E and of coupler C. To that end it comprises a multiple contact E*o* shown in FIG. 2 as a single contact. The multipling arrow placed above this contact indicates that each of the connecting wires such as A, B, C, D, etc., is in fact multipled to each of the similar contacts of the 2 connecting relays E*e* belonging to the 2 couplers serving the register group comprising the particular register involved.

Once the register-coupler connection has been established, relay C*nw* (FIG. 3) energizes: battery, relay C*nw*, back C*nz*7, wire z towards the register, multiple contact E*e*, front E*f*1, ground in the register (FIG. 2).

Further, the energization of relay C*hg* in the coupler entails the energization of relay C*nn* over battery, lower winding of relay C*nn*, back C*nf*1, front C*ng*1, ground.

In turn, the energization of relay C*nn* entails the energization of relay C*no* over battery, resistance C*r*1, energizing winding of relay C*no*, front C*nn*2, ground through a circuit already described.

Figure 4:
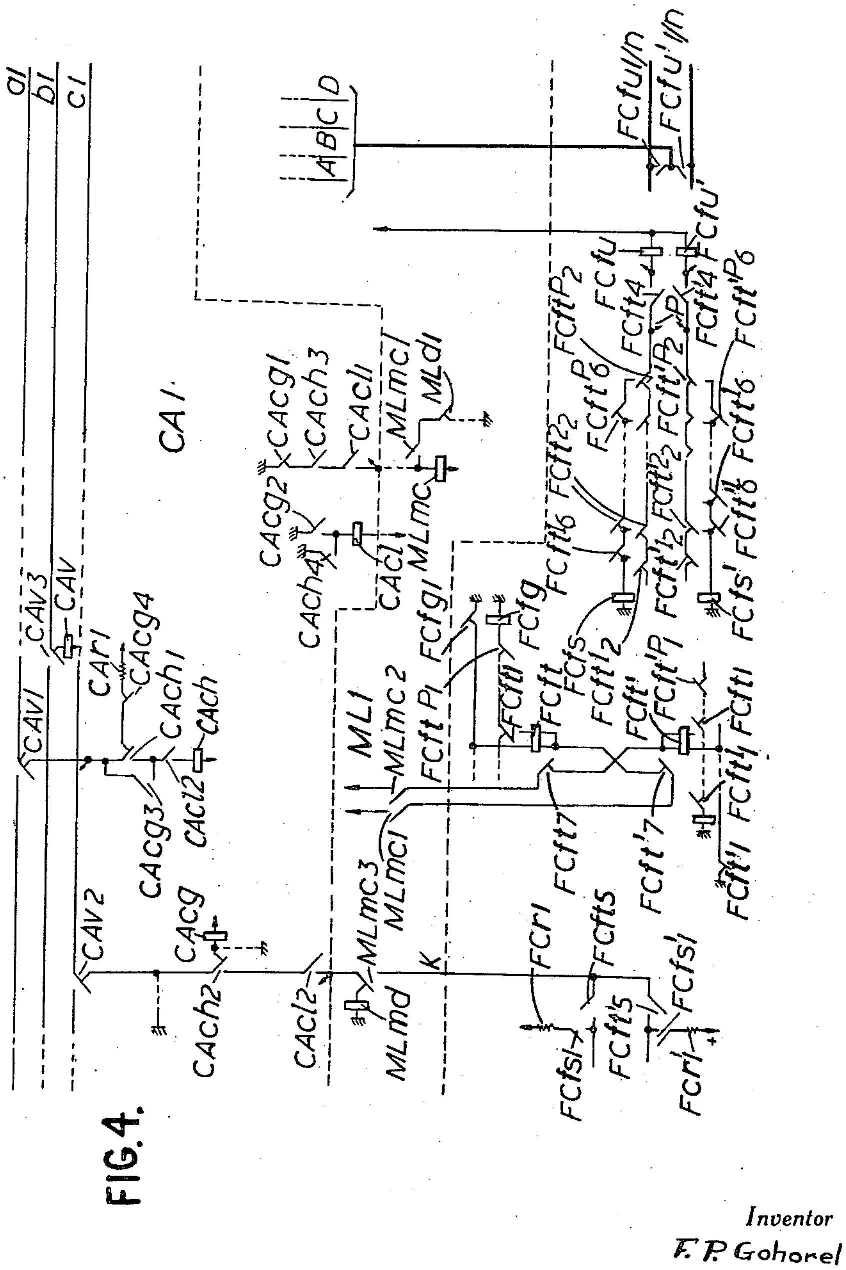
FIGS. 4 and 5 are simplified schematics of a line-selecting stage and of a group-selecting stage.

The energization of relay C*no* connects the energizing winding of relay C*nq* to wire *a*1 of call finder CA1 (FIG. 4) through register E (FIG. 2). This connection will energize relay C*nq* upon the actual seizure of line marker ML, whose function is to control the line-selecting operations (FIG. 4).

In effect, when this marker is seized, relay CA*cg* of the call-finder frame energizes over a circuit not shown. The energization of this relay entails the energization of the relay CA*c*1 connecting marker ML1, over battery, in marker ML1, energizing winding of relay CA*c*1, front CA*cg*2, ground.

The energization of relay CA*c*1 will entail the energization of relay C*nq* of the coupler, its energizing circuit being in effect completed as follows: positive battery, energizing winding of relay CA*ch*, front CA*cl*2, CA*cg*3, back CA*v*1 of the connecting magnet, call finder CA1, speaking wire *a*1 towards register connector JE, register finder CE, front E*f*1, back E*dr*1, wire *a*2 towards coupler C (FIG. 3), front C*no*2, back C*np*4, rectifier C*d*1, energizing winding of relay C*nq*, back C*tn*6, front C*nw*3, ground.

Relay CA*ch* of call finder CA1, in series with relay C*nq* of coupler C, also energizes.

The energization of relay C*nq* in coupler C (FIG. 3) prepares the energizing circuit of the receiving relays C*ra* and C*rb* designed to identify the wire group used in the trunk bundle the marker is going to select. The closing of front contact C*nq*1 ensures the preparation of this application of potential.

The closing of front contact C*nq*3 entails the energization of relays C*nj* and C*nh* over battery, energizing winding of relay C*nj*, back C*ni*1, C*nt*11, front C*nq*3, ground; battery, energizing winding of relay C*nh*, back C*tr*1, C*tn*1 . . . ground.

Further, in call finder CA1 (FIG. 4), the energization of relay CA*ch* breaks the energizing circuit of relay CA*cg*, which releases.

Relay ML*mc* of the marker energizes then to control the seizure of the trunk bundle: battery, energizing winding of relay ML*mc*, front CA*cl*1, CA*ch*3, back CA*cg*1, ground.

It was assumed in the foregoing description that the exchange involved was served by a single trunk bundle FC. In reality, this trunk bundle comprises two identical wire-groups, both of which can be used to connect a common device (the marker, in the example here under consideration) to a register E. These two wire-groups are designed to provide better distribution of the traffic and to prevent a common device from being disabled completely if either one of said wire groups develops trouble.

Each trunk bundle FC (FIG. 4) comprises a certain number of relays FC*ft*, FC*ft'* provided at the rate of one per wire group and per device to be connected to said trunk bundle. Relays FC*ft*, FC*ft'* are locked mutually for each individual device to be connected, in order to prevent the two wire-groups of the trunk bundle from being seized simultaneously by the same individual device. Also, all the relays FC*f* assigned to one wire-group of trunk bundle FC are connected in accordance with a chain currently used in automatic-telephone practice, said chain being so designed that only one individual device can be connected to a predetermined wire group at any time.

It will be noticed, further, that the priority of the chains of relays FC*ft* and FC*ft'* is reversed in order to facilitate the simultaneous seizure of the two wire-groups of the trunk bundle.

The closing of front contacts ML*mc*1 and ML*mc*2 will start the operations involved in hunting for a free wire-group in trunk bundle FC.

It will be assumed, as an example, that relay FC*ft* energizes and completes a holding circuit for itself through the closing of front contact FC*ft*1, entailing the energization of relay FC*fg*: ground, energizing winding of relay FC*fg*, chain of back contacts $FCftp_1$ . . ., front FC*ft*1, right-handing winding of relay FC*ft*, back FC*ft'*7, front ML*mc*1, battery.

The energization of relay FC*fg* breaks the availability of the first wire-group of the trunk bundle owing to the opening of back FC*fg*1.

The energization of relay FC*ft* entails the energization of relays FC*fs* and FC*fu*: ground, energizing winding of relay FC*fs*, chain of control contacts $FCft_6{}^1$ . . . , front FC*ft*4, energizing winding of relay FC*fu*, battery in line marker ML1.

The above-mentioned contact chain checks before bringing about the energization of relay FC*fu* that only one common device is attempting to be connected to the first wire-group of trunk bundle FC at that particular moment. This checking is done by the set of front and back contacts belonging to the relays FC*ft* associated with the various individual devices having access to the trunk bundle.

Relays FC*fu* are intended to connect the drive and control wires of the particular individual device involved, namely, line marker ML1, to trunk bundle FC. The number of these relays is essentially variable and depends on their individual capacity and on the number of wires in each group of the trunk bundle. In fact, with each common device are associated two connecting-relay groups, namely, FC*fu* and FC*fu'*, each of these groups being assigned to a specific wire-group of trunk bundle FC.

Further, the energization of relay FC*fs* will allow sending coupler C the identity of the trunk bundle's wire group to which marker ML1 has been connected.

To that end, the trunk bundle comprises 2 resistances FC*r*1 and FC*r'*1, respectively connected to sources of positive and negative potential with respect to ground. Depending on whether the marker involved is connected to one or the other of the wire groups of the trunk bundle serving it, either relay FC*fs* or FC*fs'* energizes and thereby sends a negative or a positive polarity to wire *k* in order to characterize the seized wire group. This polarity is transferred to wire *c*1 by front contacts ML*mc*3, CA*cl*2, CA*ch*2 and back contact CA*v*2 of the connecting magnet of call finder CA1.

Marker ML1 having been connected to the first group of trunk bundles FC, a negative polarity is sent over wire *c*1 to register E and thence to coupler C over front and back E*f*2, E*dr*3, wire *c*2, front C*no*3, back C*nf*5 and front C*nq*1. This polarity terminates in a group of two receiving relays C*ra* and C*rb* mutually locked and biased by rectifiers C*d*3 and C*d*4.

It follows from the foregoing that relay C*ra* alone will energize and control, over its front contact C*ra*2, the energization of connecting relay FC*v*. Over its multiple contact FC*v*1, this relay connects the first wire-group of trunk bundle FC to the corresponding wires of the coupler.

Figure 3:
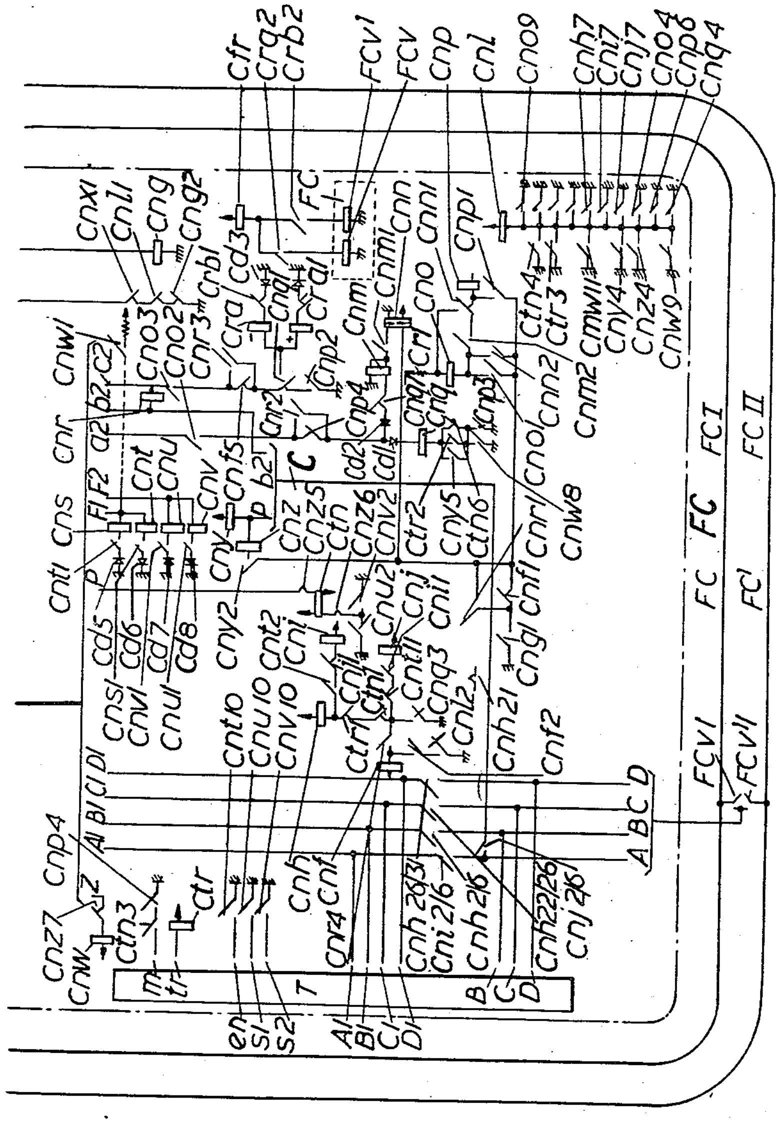
FIG. 3 is a schematic of the circuits of a coupler.

It should be noted in this connection that, in order to make it easy to read FIG. 3, the energizing windings of connecting relays FC*v* and FC*v'* are shown inside a rectangle referenced FC and arranged within the schematic representing the equipment of coupler C. It is to be clearly understood, however, that relays FC*v* and FC*v'* form an integral part of the equipment of trunk bundle FC.

It will be assumed, by way of example, that each wire group of the trunk bundle actually consists of 4 sub-groups each comprising 5 wires. In principle, each sub-group is designed to provide for the sending in coded form (in code 2 out of 5) of a digit comprised between 1 and 10. The maximum number of digits that can be sent simultaneously from register E to marker ML1 is hence 4. These 4 wire-sub-groups are referenced A, B, C, D in FIG. 4. The register sends the marker, through the trunk bundle, only numerical information concerning a specific portion of the called subscriber's number. On the other hand, when the marker must send the register non-numerical information in order to tell it the degree of progress of the selection, for example, it also uses the trunk bundle. In order not to increase unduly the number of wires of the trunk bundle, arrangements have been made to allow sub-group A to provide both for the sending of numerical information in the register-marker direction and for the sending of selection signals in the marker-register direction.

Relay C*nj* of the coupler is designed precisely to provide, over its contacts C*nj*2 . . . C*nj*6, for the connection of the 5 wires of sub-group A to the corresponding wires of coupler C. In fact, only two of these wires are shown, referenced *p* and *b*2, the other three wires being reserved for connections beyond the scope of the invention and not shown.

In the case discussed, that is, in connection with the hunting for the calling line, it has already been pointed out that relay C*nj* energized upon the seizure of the coupler. This arrangement is warranted only in this very special case: the register must not send the marker numerical information both over wire-sub-group A and over the other three sub-groups.

When the selection operations are completed, that is, when marker ML1 has selected a free inside line capable of connecting call finder CA1 to the line of calling subscriber A*b*1, it temporarily sends, over a circuit not shown in FIG. 4, a ground to one of the wires of subgroup A that finally terminates on wire *b*2 in coupler C. This ground is then sent into register E (FIG. 2) to relay E*l*, whose energization it causes. Over its front contact E*l*2, relay E*l* sends this ground back to wire *b*1 in order to cause the energization of the connection magnet CA*v* of call finder CA1.

The temporary energization of relay E*l* of the register causes the sending of current for a short instant from a ground to relay chain E*j* through front contact E*l*1. This relay chain, whose function has already been explained, is so designed that the temporary closing of front contact E*l*1 entails the release of relay E*f* and the energization of relay E*g*.

The release of relay E*f* entails the release of relay E*b* owing to the opening of front contact E*f*1. Relay E*b* upon releasing causes the release of the coupler and of relays E*c* and E*e*. The latter eliminates the connection between the drive and control wires of register E and coupler C.

In coupler C, relay C*ng* releases and, removing the general ground on this device, brings about the systematic release of the other relays that energized before.

The operations involved in hunting for the calling line having been completed, the calling subscriber is connected to register E, his line being supplied through relay E*a*, which energizes (FIG. 2).

Through a circuit not shown, he receives the dialing tone and he dials the called subscriber's number. Relay E*a* beats at the rate of the pulses received and sends them, over its front contact E*a*1, to a metering circuit EK, which may consist of relays, rotary switches or similar devices connected in accordance with known principles.

When the calling subscriber has dialed the first 4 digits of the called number, metering circuit EK causes the closing of contact E*k*4, the effect of which is to complete the energizing circuit of the relay E*b* controlling the seizure of a free coupler: battery, energizing winding of relay E*b*, front E*g*1, E*k*4, ground.

The seizure of a free coupler C (FIG. 3) is effected exactly the same way previously described. However, relay E*f* being no longer energized, ground is no longer applied to wire *z*, and relay C*nw* of this coupler remains unoperated.

It will be assumed, to begin with, that the wanted connection is a local call and that the dialing in the exchange involved comprises 7 digits, namely, an office code PQR and a numeral portion MCDU. In order to avoid busy translator T unnecessarily, it is seized after the reception of the first 4 digits of the called number.

It has been pointed out in the course of the preceding decriptions that register E sends coupler C various signals telling it the degree of progress of the selections. These signals are received by coupler C over wires F1 and F2 connected to receiving relays C*ns*, C*nt*, C*nu* and C*nv* suitably biased by rectifiers C*d*5 . . . C*d*8. Suitable polarities are sent to these wires from register E over circuits not shown. The assignment of the above-mentioned receiving relays is as follows:

(1) Relay C*ns*—control of line-selecting operations.
(2) Relay C*nt*—on an outgoing call, sending of multifrequency or decimal pulses.
(3) Relay C*nu*—control of first group-selecting operations.
(4) Relay C*nv*—control of second group-selecting operations.

Presently, therefore, register E is going to send a negative polarity to wire F2 in order to energize relay C*nu*.

Upon the connection of coupler C to register E, differential relay C*nn* energizes as already described, together with relay C*no*. However, owing to the release of relay C*nw*, relay C*nq* cannot energize.

When the hunting for the calling line has been completed, register E is connected to a first selector SP1. Before proceeding to control group-selecting stage SG1 (FIG. 1), it is necessary to check that only one register E is then engaged with the frame comprising the first selector involved. The corresponding test operation is performed by the coupler in a manner that will be explained later.

Each first-selector frame comprises a test resistance SP*r*1, normally connected to battery if the frame involved is free. Upon the energization of relay C*no*, potential is applied to relay C*nm* of coupler C (FIG. 3) over battery, resistance SP*r*1 (FIG. 5), back SP*cg*4, SP*ch*1, SP*v*1, wire *a*3 across register connector JE, register finder CE, register E, then contact E*dr*1, wire *a*2, front C*no*2, back C*np*4, rectifier C*d*2, back C*nq*7, both windings in series of relay C*nm*, ground.

If the test is successful, relay C*nm* energizes and through the closing of its front contact C*nm*1 releases differential relay C*nn*.

The success of this test is characterized by the energization of relay C*np*: battery, energizing winding of relay C*np*, back C*nn*1, front C*nm*2, C*no*1, ground over a circuit already described.

Relay C*np* completes a holding circuit for itself through the closing of its front contact C*np*1. Through the closing of front contact C*np*2 it causes the seizure of a free marker in group-selecting stage SG1. To this end, marker-seizing relay SP*cg* energizes: battery, energizing winding of relay SP*cg*, back SP*ch*2, SP*v*2, wire *c*3 towards register E, back E*dr*3, then wire *c*2 towards coupler C, front C*no*3, back C*nf*5, C*nq*1, front C*np*2, ground.

The closing of front contact C*np*3 (FIG. 3) prepares the energizing circuit of relay C*nq*.

In first-selector frame SP1 (FIG. 5), the energization of relay SP*cg* entails the energization of relay SP*ch*. Thereupon all the operations described with reference to the hunting for the calling line are repeated in identical fashion in this frame. In order to make it easier to understand the drawing, the same small-letter references of the relays have been retained. Thus, for example, relay CA*ch* of call-finder frame CA1 is similar to relay SP*ch* of first-selector frame SP1 and so forth.

It has been pointed out before that relay C*nu* energized in the coupler in order to signal to the latter the beginning of the operations involved in the control of group-selecting means SG1.

The energization of that relay entails the energization of relay C*tn*, controlling the seizure of a translator: battery, left-hand winding of relay C*tn*, back C*nz*6, front C*nu*2, ground.

Through the closing of front contact C*tn*3, relay C*tn* allows applying a ground to wire *m* for the purpose of seizing a free translator upon the energization of relay C*np* (closing of front contact C*np*4).

The circuits of the translator that are beyond the scope of the invention are not shown and the translator is shown as a rectangle referenced T.

Figure 5:
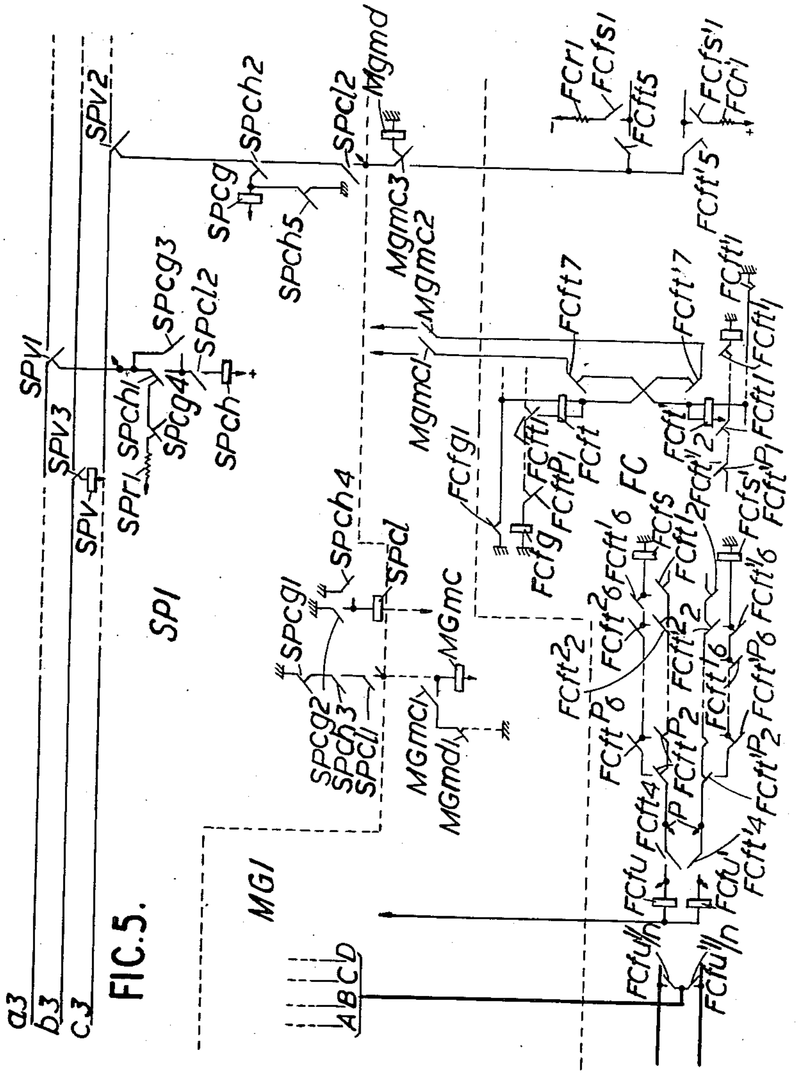

Once the translator has been seized, relay C*tr* energizes. Through the closing of its front contact C*tr*2, it completes the energizing circuit of relay C*nq*. The energizing circuit of this relay, which is identical with the one described with reference to the hunting for the calling line, will not be described. It is recalled in this connection that relay C*nq* energizes in series with relay SP*ch* of first-selector frame SP1 (FIG. 5).

The energization of relay C*nq* causes, through the opening of its back contact C*nq*7, the release of relay C*nm*. Differential relay C*nn* being unbalanced, it energizes again.

The closing of front contact C*nq*3 completes the energizing circuit of relay C*nj* over a circuit already described.

Finally, the closing of front contact C*nq*1 prepares the switching in of receiving relays C*ra* and C*rb*.

Once group marker MG1 has been connected to a wire group of trunk bundle FC, the identity of the wire group selected is sent to receiving relays C*ra* and C*rb*, one of which energizes, C*ra* for example.

The energization of relay C*ra* entails the energization of connecting relay FC*v* and of relay C*fr*.

Upon the connection of register E to translator T, the first 4 digits of the called subscriber's number are sent to the latter by wire sub-groups A1, B1, C1, D1.

It is recalled in this connection that the various digits dialed by the calling subscriber are received by a memory circuit E*k*. This circuit has 8 groups of 5 outgoing wires, referenced E*k*I . . . E*k*VIII. Each 5-wire group corresponds to a digit received by this memory circuit. In other words, the maximum capacity of this memory circuit is for 8 digits. If the number of digits dialed by the calling subscriber is less than 8, the last wire-groups such as EkVIII are left unused (case where the subscriber dials 7 digits).

Register E further comprises a routing circuit EZ intended to connect a certain number of outgoing wire groups of memory circuit Ek to the 4-wire-sub-groups A1, B1, C1, D1 giving access to coupler C. Thus, for example, to send translator T the first 4 digits of the called number, the 4 wire-groups EkI . . . EkIV must be respectively connected to wire groups A1 . . . D1. Routing circuit EZ, shown schematically, is controlled from relay chain EJ.

At the instant under consideration, the translator also receives, from coupler C, a signal telling it that control of group-selecting stage SG1 will not be required. This signal is sent through the closing of contact Cnu10, which grounds wire s1. Having effected the necessary translation, translator T sends the selective combinations to the marker through wire-sub-groups C and D by borrowing trunk bundle FC. These coded signals are received in the marker by two suitable memory circuits, not shown in FIG. 5.

Further, upon the connection of coupler C to marker MG1 through trunk bundle FC, a ground is sent by the latter to one of the 5 wires of sub-group A. This ground causes the energization of relay Cny.

When the code sent by translator T has been suitably received by marker MG1, the energizing circuit of relay MGmc is broken by means not shown, thereby releasing trunk bundle FC.

In the coupler, relays Cra, Cfv and FCv release.

The ground being then removed from wire p in coupler C (FIG. 3), relay Cny holds over its front contact Cny2, thereby causing the energization of relay Cnz.

The energization of relay Cnz will cause the release of translator T owing to the release of translator-seizing relay Ctn, whose energizing and holding circuits are broken through the opening of back contacts Cnz5 and Cnz6.

The coupler will remain engaged with the register during the first group-selecting operations.

When these operations have been completed, group marker MG1 is again associated with the trunk bundle (energization of relay MGmc over a circuit not shown). Coupler C having received the identity of the seized wire group over receiving relays Cra or Crb, it is associated with it in turn.

As in the hunting for the calling line, marker MG1 then sends the connection signal in the form of a ground appearing on wire b2 in coupler C (FIG. 3). This ground is sent to relay E1 of the register and thence to connecting magnet SPv of first selector SP1, which energizes. The operation of first selector SP1 entails the operation of second selector SS1 (FIG. 1) in accordance with a method described in the aforementioned patents and certificate-of-addition applications.

The sending of connecting ground to wire b2 in coupler C (FIG. 3) causes, in addition, the temporary energization of relay Cnr, which through the closing of its front contact Cnr4 completes the energizing circuit of relay Cnf: battery, energizing winding of relay Cnf, front Cnr4, Cnq3, ground.

Relay Cnf in turn completes a holding circuit for itself through the closing of its front contact Cnf2. This relay is intended to cause the partial release of the coupler when the first group-selecting operations are completed.

In this connection it should be noted that the coupler comprises a relay Cnl that remains energized as long as one of the relays of the coupler remains energized, with the exception of seizing relay Cng.

Further, the release of the seized marker entails the release of the trunk bundle, which entails the release of relays FCv, Cra and Cfr.

Through the opening of its back contact Cnf1, relay Cnf breaks, upon the falling back of relay Cnr, the energizing circuit of the set of relays Cno, Cnp and Cnn, whereupon relay Cnq releases in turn, owing to the opening of front contact Cnp3. It also entails the release of Cnj.

When all these relays have released, partial-release control relay Cnl releases in turn and entails the de-energization of relay Cnf, which restores the general holding ground through the closing of its back contact Cnf1. The coupler thus remains engaged with the register through the energization of relay Cng. Moreover, when relay Cnf has released again, relay Cnn is re-energized, along with relay Cno (closing of front contact Cnn2).

In register E, the temporary closing of front contact El1 causes relay chain Ej to advance one step. In other words, relay Eg releases and relay Eh energizes. The coupler-seizing circuit is therefore not broken, owing to the closing of front contact Eh1, which continues to maintain relay Eb energized.

At this time, therefore, register E is enraged with a free first selector SP2. The operations of controlling the second group-selecting stage are about to commence.

Over a circuit not shown in FIG. 2, a positive polarity is sent by the register to wire F2. Relay Cnv of coupler C then energizes. Relay Cnu, previously energized, releases.

The operations of controlling the second group-selecting stage are identical in all respects with those just described with reference to the first stage. They will therefore not be described again, and the corresponding detail circuits, representing, in particular, the seized group marker MG2, are not shown.

However, it will be noted that, upon the seizure of transistor T by coupled C, a ground is applied by the latter to wire s2 over front contact Cnv10. This signal tells the translator that it is a question this time of controlling second group-selecting stage SG2 and that, therefore, it is necessary to modify the code used for sending the selective combinations to wire sub-groups C and D.

At the end of the group SG2 selecting operations, the connection ground appearing on wire b2 of the coupler (FIG. 3) is sent, as usual, into the register and causes the temporary energization of relay El, which, by sending a pulse to relay set EJ, causes the release of relay Eh and the energization of relay Ei.

The energizing circuit of relay Eb is broken this time and coupler C is released.

When calling subscriber Ab1 (FIG. 1) has fully completed dialing the called subscriber's number, contact Ek7 or Ek8 closes, depending upon the number of digits in the called subscriber's number, thus causing the re-energization of relays Eb and the re-seizure of a free coupler C.

A negative polarity is applied by register E to wire F1 (FIG. 2), thereby causing the energization of relay Cns of the coupler (FIG. 3), telling it that it will now be unnecessary to control line-selecting means SL2. As examination of FIG. 2 will show, relays Cnu and Cnv remain unoperated and thereby prevent the energization of relay Ctn, thus preventing the seizure of a translator T.

The holding of relay Ctn unoperated entails the holding of relay Ctr in the same condition and therefore relay Cnh can pull up upon the energization of relay Cnq following the seizure of a line marker ML2 (FIG. 1).

The energization of relay Cnh has the effect of extending wire sub-groups B, C, D from trunk bundle FC to the corresponding sub-groups in register E.

The same as for the group SG2 selecting operations, no detail circuit is shown for the control of line-selecting means SL2. This control method is actually identical in all respects with the one described with reference to group-selecting means SG1.

It will be noted however that the selective combinations are this time sent by register E to line marker ML2 through trunk bundle FC. These selective combinations are sent over the three wire-sub-groups B, C, D. They therefore comprise only the hundreds, tens and units digits. These combinations are in fact sufficient for line marker ML2 to control the corresponding line-selecting means provided the latter's capacity does not exceed 1000 subscribers.

At the end of the corresponding line-selecting operations, the marker sends, as usual, the connection ground to wire *b*2 of the coupler (FIG. 3). The connection is thereupon established in accordance with the usual method and register E is released, along with coupler C.

Arranging the figures of the drawing as shown in FIG. 9, the method will now be described of routing an outgoing call to a distant exchange for which the selective combinations must be sent in the form of decimal pulses.

When register E has received a sufficient number of digits to be able to start the selections at the distant exchange, it is associated with a free sender V (FIG. 6) through a sender finder CV. Since the detail circuits of this sender and those of the corresponding finder are beyond the scope of this invention, they are not shown. This sender further comprises essentially a series of memory relays such as V*m*, divided up for example into 4 groups of 5, each for the recording of a digit in code 2 out of 5. When the coded information is received by the sender, a cam V*k* is started and controls a repeater relay V*n* that, over its contact V*n*1, causes the rhythmical opening of the loop consisting of wires *a*4, *b*4. The operation of cam V*k* is controlled by a circuit VC whose function is to send the various pulse trains to the line. The operation of such a sending device has already been described in (French) certificate-of-addition application No. PV 687,176/1,069,160, filed by applicant on March 9, 1955, for improvements in automatic telephone systems.

Once the seizure of decimal sender V has been effected, contact V*k*1 closes and completes the energizing circuit of relay E*dr*, which energizes in register E (FIG. 2): battery, energizing winding of relay E*dr*, wire *g*2, sender finder CV, back V*p*2, front V*k*1, ground.

Through the closing of its front contact E*dr*1, relay E*dr* completes the energizing circuit of relay E*b*, for the purpose of seizing a free coupler C (FIG. 3).

This coupler is seized in accordance with a method already described.

Upon the seizure of the coupler, register E sends, over a circuit not shown, a positive polarity to wire F1 in order to energize relay C*nt*. If the office code to be sent must be translated, a ground is further applied to wire *p*, for the purpose of energizing translator-seizing relay C*tn*. This seizure, it will be recalled, is not effected until relay C*np* energizes (closing of front contact C*np*4).

Figure 6:
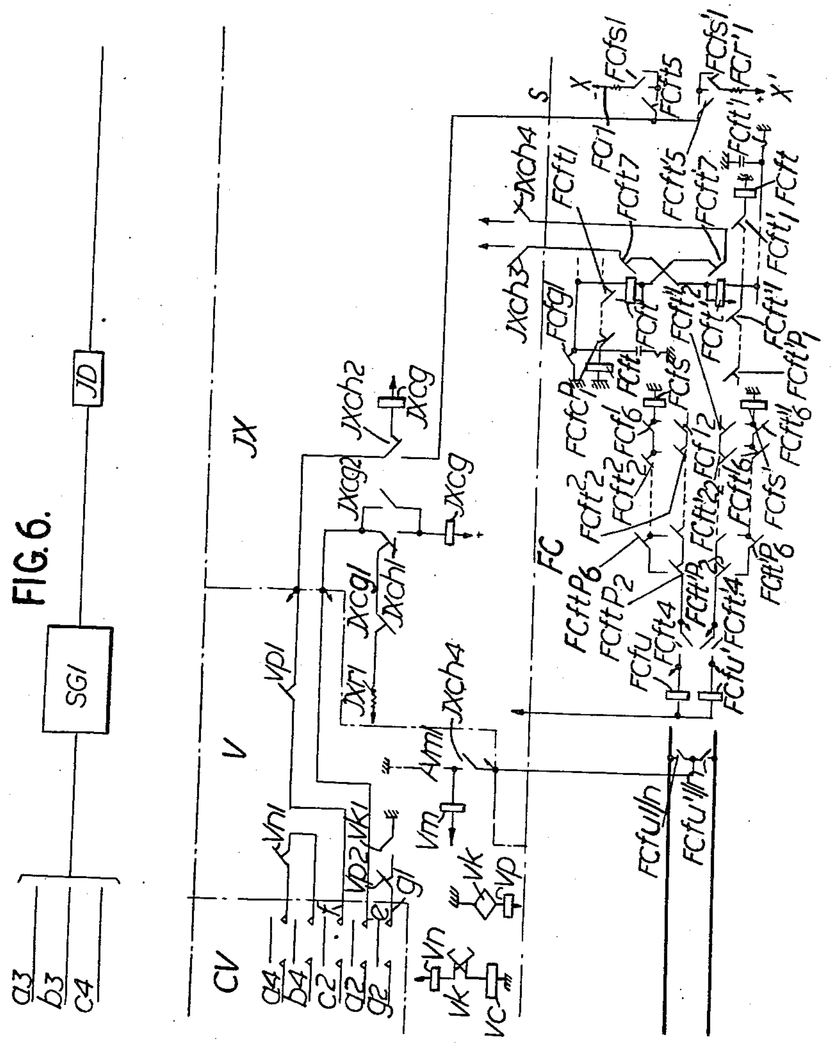
FIG. 6 is a simplified schematic of the circuits of a decimal-pulse sender.

As examination of FIGS. 1 and 6 will show, no sender V has direct access to trunk bundle FC. Accordingly, an auxiliary trunk JX is provided to connect a certain number of senders V to trunk bundle FC.

When an indirect connection must be established between a sender V and the trunk bundle to which it has access, coupler C starts by testing the auxiliary trunk JX serving that sender, which trunk, if free, is thereupon connected to the corresponding trunk bundle.

Thus, for example, in the example under consideration, when coupler C is seized, its wire *a*2 is connected through register E and sender finder CV to resistance JX*r*1, designed to test auxiliary trunk JX. In other words, this resistance is similar to the resistance CA*r*1 (FIG. 4) designed to test call-finder frame CA1 during the calling-line-hunting operations. If this test is successful, that is, if auxiliary trunk JX is not then engaged with some other sender of the same group, relay C*nm* of the coupler (FIG. 3) energizes, while relay C*nn* releases. Relay C*np* thereupon energizes as usual and grounds wire *c*2. The energization of relay C*np* can, in addition, cause the seizure of the translator (closing of C*np*4), as already described. Through sender finder CV, wire *c*2 is connected to wire *f*, the effect being to energize the relay JX*cg* used for seizing auxiliary trunk JX.

The energization of relay JX*cg* completes, through the closing of its front contact JX*cg*2, the energizing circuit of relay JX*ch*, which energizes: positive polarity, energizing winding of relay JX*ch*, front JX*cg*2, wire *e*, sender finder CV, wire *a*2 towards coupler C, front C*no*2, back C*nf*4, rectifier C*d*1,, energizing winding of relay C*nq*, back C*tn*6 or front C*tr*2 (depending upon whether the translator is seized or not), front C*np*3, ground.

Relay C*nq* in series with relay JX*ch* energizes, characterizing in coupler C the actual seizure of auxiliary trunk JX.

Moreover, in auxiliary trunk JX (FIG. 6), the energization of relay JX*ch* entails the release of relay JX*cg* owing to the opening of back contact JX*ch*2.

The closing of front contact JX*ch*2 provides for the connection of wire *s*, used for the identification of trunk bundle FC, to the corresponding *f* wire.

Relay JX*ch*, in addition, completes a holding circuit for itself through the closing of its front contact JX*ch*1.

The opening of back contact JX*ch*1 removes the availability battery of auxiliary trunk JX from wire *e*.

Finally, the closing of front contacts JX*ch*3 and JX*ch*4 completes the circuit seizing trunk bundle FC.

To each auxiliary trunk JX is assigned a set of two seizing relays FC*ft*, FC*ft'*, each corresponding to one of the two wire-groups of the trunk bundle involved.

The operation of these two relays is similar to the operation of the FC*ft*, FC*ft'* relays mentioned before in connection with the hunting for the calling line.

If a wire group (the first, for example) of trunk bundle FC is free at that time, said group can be connected to auxiliary trunk JX, through the energization of multi-contact connecting relay FC*tu*.

In addition, the identification polarity of this wire group is applied as usual to wire *s* through the closing of front contacts FC*fs*1 and FC*ft*5. This polarity is sent through sender finder CV over wire *c*2 to coupler C, where it is received by receiving relays C*ra* and C*rb*.

Coupler C in turn is connected to one of the wire groups of trunk bundle FC (the wire group with which auxiliary trunk JX is currently engaged).

If the office code to be sent must be translated, translator T receives it from register E (over wire sub-groups A1, B1, C1, D1) and after translation sends it to decimal sender V through trunk bundle FC and auxiliary trunk JX. This office code is received by memory relays V*m*. If the code is suitably received by sender V, control pyramid V*k* provides metallic continuity, thereby causing the energization of relay V*p*, which through the opening of its back contact V*p*1 eliminates the sending of the identification polarity over wire *c*2 to coupler C. In the latter, code-receiving relays C*ra* or C*rb* release, consequently causing the release of connecting relays FC*v* or FC*v'*.

Moreover, the opening of back contact V*p*2 causes the release of relay E*dr* in register E (FIG. 2), thereby causing the release of coupler C, as well as of translator T.

At this time, therefore, register E remains engaged only with sender V through sender finder CV. This sender sends the dialing pulses through the breaking of the loop between wires *a*4 and *b*4.

If the office code to be sent must not be translated, the register sends it directly to the sender through coupler C. In this case, relay C*tn* does not energize and relays C*nh* and C*ni* can pull up upon the energization of relay C*nq*. This allows connecting wire sub-groups A1, B1, C1, D1 and sub-groups A, B, C, D.

When the pulse train corresponding to the office code, translated or not, has been sent by the sender, the latter releases and so tells the register over a circuit not shown.

To send the following digits, register E will again seize sender V twice in succession so as to be able to send the latter first the first portion of the called subscriber's number and then the second. Thus, for example, in the case of an 8-digit number, the register will first send sender V the first 4 and then the last 4 digits.

As previously pointed out in the course of the general description, sender V is released between two consecutive sendings, together with coupler C, trunk bundle FC and auxiliary trunk JX.

It should be noted that, during the sending of the first or of the second portion of the called subscriber's number to sender V, relay *Ctr* remains unoperated in coupler C (FIG. 3), because the translator is not seized.

Further, relay *Cnt* is energized upon each seizure of the coupler.

Consequently, relays *Cnh* and *Cni* will energize simultaneously upon the energization of relay *Cnq*, which, it will be recalled, characterizes the actual seizure of the auxiliary trunk JX (FIG. 6) serving the sender V seized by register E.

The simultaneous energization of relays *Cnh* and *Cni* has the effect of connecting the 4 wire-sub-groups A1, B1, C1, D1 from the register to the corresponding sub-groups having access to trunk bundle FC (closing of front contacts *Cnh*2/6, *Cnh*22/26, *Cnh*26/31 and *Cni*2/6).

The method of sending multifrequency pulses is similar to the one just described with reference to the sending of decimal pulses. Consequently, the corresponding detail circuits are not shown.

It will be noted, however, that neither trunk bundle FC nor the corresponding auxiliary trunk JX' (FIG. 1) is released during the whole sending cycle.

It has been assumed in the preceding descriptions that the exchange involved comprised only one trunk bundle FC, consisting of two wire-groups FCI and FCII.

Such an arrangement can in fact exist only in a small-capacity exchange. In most cases, for reasons of dependability, a much larger number of trunk bundles will generally be available.

The method will now be described, as an example, of wiring the receiving relays of a coupler designed to be used in an exchange having a relatively large number of trunk bundles.

It will be assumed that the exchange has 5 types of common devices capable of being connected to the registers through a certain number of trunk bundles. These 5 types of devices could, for exampe, comprise:

(*a*) The line-selection markers, when seized to hunt for the calling line;
(*b*) The line-selection markers, when seized to hunt for the called line;
(*c*) The group markers of the first group-selecting stage;
(*d*) The group markers of the second group-selecting stage;
(*e*) The decimal-pulse and multifrequency-pulse senders.

It follows from the above enumeration that the line marker will, in fact, have access to two special trunk bundles, the one for the hunting of the calling line and the other for the hunting of the called line.

It will be assumed, further, that for each of these types there are three trunk bundles, each comprising two wire-groups.

In other words, each trunk bundle of a predetermined type will therefore serve only one third of the common devices comprised in that type.

FIG. 7 shows the modifications that are to be made to coupler C of FIG. 3 in order to adapt it to this special operating method.

For discrimination of the wire group to which a common device (line marker, group marker, . . .) can be connected, coupler C comprises a receiver capable of receiving the identity of said wire group in the form of 2 frequencies. Since for each type of common devices there are a total of 6 wire-groups, divided up into 3 trunk-bundles, it suffices to use 4 frequencies (code 2/4). Receiver R will therefore be designed to receive 4 frequencies as a maximum. This receiver, whose principle is well known in the automatic-telephone and remote-control art, is represented in simplified form by a rectangle referenced R. It is provided with 1 incoming wire *x* and 6 outgoing wires *y*. Upon the simultaneous reception of two frequencies, one of the contacts referenced *R*1/6 closes, thereby connecting wire *x* to a wire *y*. This receiver can be connected to wire *c*2 of the coupler (see FIGS. 3 and 6) through contact *Cnq*1, previously mentioned.

Coupler C (FIG. 3) further comprises 5 relays *Cnw*, *Cns*, *Cnt*, *Cnu* and *Cnv*, whose energization characterizes the degree of progress of selections under way, namely:

Relay *Cnw*—hunting for the calling line;
Relay *Cns*—line selection in the case of hunting for the called line;
Relay *Cnt*—outgoing call, seizure of a decimal or multifrequency sender;
Relay *Cnu*—control of the first group-selecting stage;
Relay *Cnv*—control of the second group-selecting stage.

While they define the degree of progress of the various selection operations, the above-mentioned relays further characterize the different categories of common devices referred to before and coming into play at the time of these selections. Thus, for example, when relay *Cnw* pulls up it characterizes, in the coupler, that calling-line-hunting operations are involved and that the common device coming into play in this case is a line marker hunting for the calling line. Likewise, the energization of relay *Cnt* characterizes, in the coupler, the outside selections and, in addition, tells the latter that the common devices coming into play in this case are decimal or multifrequency senders.

Each of the 6 wires is multipled thereto over 5 contacts respectively belonging to the relays *Cnw* . . . *Cnv* characterizing the various categories of common devices. There are thus available a total of 30 outlets for the 30 wire-groups belonging to the 15 trunk-bundles serving the exchange involved.

It will be recalled that these 15 trunk-bundles are divided up into 5 groups of 3, each serving a specific type of common devices.

The 6 wires of each outlet are divided up into 2 groups of 3, each being associated with a wire group of a trunk bundle serving the common devices of the category involved.

Each outgoing wire controls a connecting relay intended to connect the 4 wire-sub-groups A, B, C, D of coupler C to the trunk-bundle wire group serving a specific common device.

Thus, for example, in the hunting for a calling line, the seized line marker ML1 (FIG. 4), when it is connected to the one of the two trunk-bundle wire groups serving it, the first wire-group, for example, will cause the sending over wire *c*1 of two frequencies characterizing the identity of the wire group involved. To this end, resistances FC*r*I and FC*r*I' of FIG. 4 are then connected to generators, not shown, supplying currents of suitable frequencies.

Hence, when line marker ML1 is connected to a wire group of a trunk bundle allotted to the hunting for the calling line, receiver R receives two frequencies.

Moreover, in coupler C, relay *Cnw*, characterizing the calling-line-hunting operations, is energized. The closing of one of contacts *RI*/6 therefore has the effect of energizing one of the 3 relays FC*a* capable of connecting the 4 wire-sub-groups A, B, C, D of coupler C to the corresponding wire group of the one of the trunk bundles *FC*1/3 serving line marker ML1 in the case of the calling-line-hunting operations.

In other words, when a coupler must be associated with a wire group of a trunk bundle already engaged with a common device, it receives from the register a signal telling it the category of said common device (energization of one of relays *Cnw* . . . *Cnv*).

Moreover, the common device sends that coupler in coded form the identity of the wire group belonging to said category and with which it is engaged.

Such an arrangement therefore allows the identification of a large number of individual wire-groups, 30 in the example chosen, while using a relatively small number of identification frequencies, namely, 4.

It is quite obvious that the foregoing descriptions have been given only as a nonlimitative example and that other variants can be envisaged without departing from the scope of the invention.

Thus, the signals in code 2/5 sent over the various consecutive wires of the trunk bundle can be sent by any other means, particularly by frequency-combination methods that will allow reducing, if necessary, the number of these wires.

Moreover, it is possible to apply this invention to telephone systems of some other type than the one mentioned in the course of the foregoing descriptions.

It may happen during the above-mentioned selection operations that, owing to operating trouble, the seized marker will be slow in sending the register the connection signal or, more specifically, the information concerning the outcome that a selection under way is to have. In French Patent No. 1,130,220, filed by applicant on July 5, 1955, it has been pointed out that each register comprises a time device intended to check the time taken to make each selection.

In the system covered by the present invention, each register also comprises a time device, similar to the one mentioned above. If a selection is slow in being made, the time device operates and the seized register E (FIG. 1) then sends the marker involved, over the speaking chain, a signal directing it to connect itself to a free wire-group of the trunk bundle serving it. When this connection has been effected, the seized marker sends that wire group's identity to the coupler in accordance with the previously-described method. The register, being thus again connected to the marker, can then be associated with a fault register not shown.

*Résumé*

Improvements in automatic telephone systems wherein the exchange of information between common and individual devices is effected through low-holding-time trunks, called "trunk bundles."

What is claimed is:

1. In an automatic telephone system serving lines terminated at switching apparatus comprising a series of switching stages through which connections from calling lines to called lines progress successively over idle interstage paths, marker apparatus individual to the switching stages, groups of apparatus common to all said switching stages, each group comprising a plurality of registers and a plurality of translators, first connection means for coupling one of said groups of common apparatus to an idle one of the interstage paths between a first and a second switching stage, groups of multipling circuits between said common equipment and said markers with each group of multipling circuits being accessible by all of said marker apparatus, means for successively and temporarily coupling the said markers to the common apparatus over said multiplying circuits, and means controlled by signals transmitted over the said multipling circuits for operating the common apparatus to transmit signals over the said first connecting means and over the said multipling circuit to control the said connection from a calling line to a called line.

2. An automatic telephone system according to claim 1 wherein each multiplying circuit includes a set of terminals and wherein a concentrating coupler is provided for connecting the said multipling circuits to the common apparatus, whereby the number of sets of terminals in the said common apparatus is less than the number of multipling circuits.

3. An automatic telephone system, as defined in claim 1, in which certain of the common apparatus are passive devices and other of said common apparatus are active devices, each active device comprising means for selecting one of said multipling circuits, and means in each multipling circuit responsive to the seizure thereof for sending an identification signal to a passive device having access to all the multipling circuits, and means responsive to said identification signal for thereupon connecting said passive device to the selected multipling circuit.

4. An automatic telephone system, as defined in claim 1, a coupler, means for connecting a register to a multipling circuit through said coupler, means connected to said coupler responsive to the connection of said coupler between said register and said multipling circuit for connecting said coupler to an idle one of said translators, means in said register for recording called telephone numbers and for sending signals representing portions of said number to said translator, means in said translator for analyzing said signals and for sending corresponding translated signal combinations to the connected multipling circuit through the register, whereby the memory circuit normally provided in the register is eliminated.

5. An automatic telephone system, as defined in claim 1, a plurality of couplers, means for connecting a free coupler with a register whenever a selection in a switching stage must be controlled, means connected to said coupler for testing a switching stage, means responsive to said testing means for controlling the seizure of a free translator and sending a signal through the register to said first stage, means responsive to said signal for seizing a marker associated with said first switching stage, means in said marker responsive to the seizure thereof for selecting a multipling circuit serving said marker, means in said multipling circuit for sending a signal through said register to said coupler, and means in said coupler responsive to said signal for identifying said marker and for connecting said coupler to said marker over said selected multipling circuit.

6. An automatic telephone system, as defined in claim 5, further comprising means in the marker for connecting itself with a selected multipling circuit anew at the beginning of the control of a switching stage selection, means for transmitting a signal in coded form representing the identity of said selected multipling circuit to the coupler through the said register, means in said coupler responsive to said signal for seizing said selected multipling circuit, means in the marker responsive to the seizure of the said multipling circuit for transmitting a signal to the register representative of the action to be taken on the call, and means responsive to the sending of such signal for thereupon releasing said marker and said multipling circuit.

7. An automatic telephone system, as defined in claim 6, further comprising means for maintaining the connection of the coupler at the end of the control of the first switching stage and for operating the testing means for testing the next switching stage.

8. An automatic telephone system, as defined in claim 7, further comprising means in the register for indicating at the seized coupler at any time the degree of progress of selections under way, and means in said coupler responsive to said indication accordingly identifying the translated combinations it must provide.

9. An automatic telephone system, as defined in claim 8, further comprising means in the coupler responsive to the indications received from the register relating to the degree of progress of the various switching stage selections for causing said coupler to prevent seizure of a translator when untranslated selective combinations are to be sent to the seized marker and to cause said coupler to connect the multipling circuit directly to the register in order to permit the register to send a portion of the called number to the seized marker required for the control of the corresponding selection.

10. An automatic telephone system, as defined in claim 1, in which the common apparatus comprise registers and pulse senders, said system further comprising means in each register operative when a call is intended for a subscriber at a distant exchange for connecting said register with a pulse sender, means for transmitting the various selective signal combinations required for the distant selections in code in succession to said sender through the seized multipling circuit, means in said sender responsive to said coded selective signal combinations for transmitting said signal combinations in the form of pulses, to said distant exchange.

11. An automatic telephone system, as defined in claim 10, further comprising means in each register responsive to the initiation of the control of selections at a distant station for connecting said register to a pulse sender, an auxiliary trunk serving said pulse sender, means in said register responsive to the connection to said pulse sender for connecting said register with a free coupler, means in said coupler responsive to the connection thereto for testing the auxiliary trunk serving said pulse sender and responsive to said testing means for connecting said sender to said auxiliary trunk, means responsive to the connection of said auxiliary trunk for connecting said auxiliary trunk with a idle multipling circuit, means for thereupon transmitting a signal corresponding to the identity of said idle multipling circuit through said pulse sender and said register to said seized coupler, means in said coupler responsive to said identity signal for connecting said coupler to said selected multipling circuit in order to transmit the corresponding selective combination to said sender.

12. An automatic telephone system, as defined in claim 11, further comprising means in each translator responsive to a first seizure by a register for transmitting to said register a signal indicating whether the said code to be transmitted is in translated or untranslated form, means in said register for transmitting said signal to the seized coupler, and means in the coupler responsive to said signal indicating transmission in translated form for connecting said coupler to an idle translator and responsive to said signal indicating transmission in untranslated form for connecting said register directly to said multipling circuit in order to transfer the necessary selective signal combinations to the seized sender.

References Cited in the file of this patent

UNITED STATES PATENTS

| | | |
|---|---|---|
| 2,149,646 | Voss | Mar. 7, 1939 |
| 2,654,807 | Shepherd | Oct. 6, 1953 |
| 2,777,015 | Jacobaeus et al. | Jan. 8, 1957 |
| 2,813,929 | Oberman | Nov. 7, 1957 |
| 2,853,556 | Gohorel | Sept. 23, 1958 |
| 2,882,342 | Davison et al. | Apr. 14, 1959 |
| 2,882,343 | Gohorel | Apr. 14, 1959 |
| 2,882,344 | Henquet et al. | Apr. 14, 1959 |
| 2,909,611 | Hutton et al. | Oct. 20, 1959 |